(12) United States Patent
Kawamata et al.

(10) Patent No.: US 6,345,320 B1
(45) Date of Patent: Feb. 5, 2002

(54) DMA ADDRESS BUFFER AND CACHE-MEMORY CONTROL SYSTEM

(75) Inventors: Shigeaki Kawamata, Kawasaki; Atsushi Yoshioka, Yokohama, both of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/164,677

(22) Filed: Oct. 1, 1998

(30) Foreign Application Priority Data

Mar. 20, 1998 (JP) .......................................... 10-071099

(51) Int. Cl.[7] .......................... G06F 12/00; G06F 13/00
(52) U.S. Cl. .............................. 710/22; 710/23; 710/5; 710/52; 710/129; 711/139; 711/141; 711/143; 711/144; 711/146
(58) Field of Search ........................... 710/22, 129, 52, 710/23, 5; 711/139, 141, 151, 143, 144, 146

(56) References Cited

U.S. PATENT DOCUMENTS

| 5,724,550 | A | * | 3/1998 | Stevens | 711/146 |
| 5,749,093 | A | * | 5/1998 | Kobayashi et al. | 711/139 |
| 5,819,105 | A | * | 10/1998 | Moriarty et al. | 710/5 |
| 5,850,534 | A | * | 12/1998 | Kranich | 711/144 |
| 5,860,111 | A | * | 1/1999 | Martinez, Jr. et al. | 711/143 |
| 5,884,100 | A | * | 3/1999 | Normoyle et al. | 710/52 |
| 5,893,153 | A | * | 4/1999 | Tzeng et al. | 711/141 |
| 5,966,728 | A | * | 10/1999 | Amini et al. | 711/146 |
| 6,047,337 | A | * | 4/2000 | Smith | 710/23 |
| 6,178,492 | B1 | * | 1/2001 | Matsuo | 712/23 |

FOREIGN PATENT DOCUMENTS

JP  1-112451  5/1989

\* cited by examiner

*Primary Examiner*—Thomas Lee
*Assistant Examiner*—Tammara Peyton
(74) *Attorney, Agent, or Firm*—Rosenman & Colin LLP (57) ABSTRACT

A system includes a main-memory unit, an input/output-control unit which performs a write operation with respect to the main-memory unit by way of direct memory access, and a central-control unit which operates based on information stored in the main-memory unit, the central-control unit including a cache memory which temporarily stores some of the information, and a DMA buffer which temporarily stores a DMA address indicated by the direct memory access.

9 Claims, 7 Drawing Sheets

FIG.8A CLOCK
FIG.8B IADD
FIG.8C IREQ
FIG.8D IACK
FIG.8E IDATA
FIG.8F ICACHEDATA
FIG.8G IHIT
FIG.8H ICACHEWE

FIG.8I PADD
FIG.8J PREQ
FIG.8K PRW
FIG.8L PACK
FIG.8M PRDATA
FIG.8N PWDATA
FIG.8O PCACHEWE
FIG.8P PHIT
FIG.8Q PCACHEWE

FIG.8R IDLABR
FIG.8S IDLREQ
FIG.8T IDLACK

OPERAND-WRITE CYCLE

I-CACHE-INVALIDATION CYCLE

DMA ADDRESS BUFFER AND CACHE-MEMORY CONTROL SYSTEM

BACKGROUND OF THE INVENTION

1. Field of the Invention

The present invention generally relates to cache-memory-control systems, and particularly relates to a cache-memory-control system which achieves an enhanced system performance by introducing cache arbitration.

2. Description of the Related Art

Figure 1:
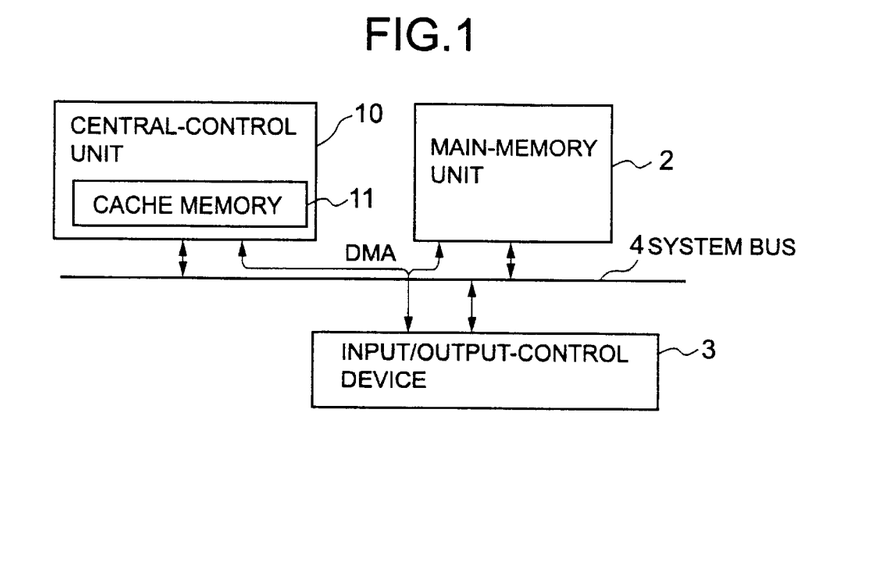
FIG. 1 is a schematic block diagram of a related-art system.

FIG. 1 is a schematic diagram of a related-art system.

A configuration of FIG. 1 includes a central-control unit 10, a cache memory 11 provided in the central-control unit 10, a main memory 2, an input/output-control device 3, and a system bus 4 which connects between these elements. The cache memory 11 stores instructions and data of frequent use and initially stored in the main memory 2 with aim of eliminating a need for the central-control unit 10 to access the main memory 2 each time such instructions and data become necessary. Namely, the cache memory 11 is a temporal storage capable of a high-speed operation.

In the system as described above, a cache-control unit monitors an address used when the input/output-control device 3 accesses the main memory 2. In general, such a system is provided with a bus-snoop function in order to avoid data inconsistency between the cache memory 11 and the main memory 2. Such data inconsistency may arise when data is written in the main memory 2 by use of a DMA (direct memory access) mode.

A measure generally taken to achieve the bus-snoop function includes invalidating cache data when the DMA-write access is directed to an address encompassed by the cache memory 11. In such a scheme, the bus-snoop function monitors the system bus 4 during a period when the input/output-control device 3 accesses the main memory 2 by use of a DMA mode. During this period, the central-control unit 10 cannot gain access to the cache memory 11, and has to wait until the access is granted.

There are some systems which are provided with a cache memory for instructions and a separate cache memory for operands. In such systems, an operand-write operation, which is initiated upon execution of an instruction by central-control unit, is only reflected by the operand cache. When there is a need to rewrite instructions, on the other hand, the instruction cache is invalidated in an entirety thereof in order to avoid data inconsistency with the main memory. Alternatively, an instruction-cache invalidating mode may be provided to take effect during a write operation, and invalidates a particular set of data in the instruction cache when the write address matches.

In order to overcome problems associated with the first scheme described above, Japanese Laid-open Patent Applications No. 5-97378 and No. 6-94821 disclose a bus-snoop control unit which is provided with a buffer as a temporal storage of DMA addresses. In this scheme, the cache invalidating operation is performed when a CPU becomes available, thereby avoiding a reduction in a processor-bus performance. If the buffer becomes full, however, the DMA operation has to be stopped, or the cache memory in its entirety has to be invalidated. This results in affecting the system performance.

In the case of the systems having both an instruction cache and an operand cache, generally, whole contents of the instruction cache are invalidated in order to avoid data inconsistency between the cache and the main memory. Nullification of all the cache contents inevitably brings down the system performance. In the case in which a only particular set of data in the instruction cache is invalidated when write addresses match during the instruction-cache invalidating mode, there is another problem in that operations for loading instructions are aborted each time the write access is made.

Accordingly, there is a need for a cache-memory-control system which can enhance system performance.

SUMMARY OF THE INVENTION

Accordingly, it is a general object of the present invention to provide a cache-memory-control system which can satisfy the need described above.

It is another and more specific object of the present invention to provide a cache-memory-control system which can enhance system performance.

In order to achieve above object according to the present invention, a system includes a main-memory unit, an input/output-control unit which performs a write operation with respect to the main-memory unit by way of direct memory access, and a central-control unit which operates based on information stored in the main-memory unit, the central-control unit including a cache memory which temporarily stores some of the information, and a DMA buffer which temporarily stores a DMA address indicated by the direct memory access.

According to one aspect of the present invention, the system as described above is such that the central-control unit invalidates a cache address in the cache memory when the DMA address stored in the DMA buffer matches the cache address.

According to another aspect of the present invention, the system as described above is such that the cache memory includes an instruction-cache memory which stores instructions as part of the information, and an operand-cache memory which stores operands as part of the information, and such that the central-control unit includes a cache-invalidation buffer which temporarily stores an operand-write address when an operand is written in the operand-cache memory, and invalidates a cache address in the cache memory when the operand-write address stored in the cache-invalidation buffer matches the cache address.

According to another aspect of the present invention, a system includes a main-memory unit, an input/output-control unit which performs a write operation with respect to the main-memory unit by way of direct memory access, a CPU which operates based on information stored in the main-memory unit, a cache memory which temporarily stores some of the information, and avails the some of the information to the CPU when the CPU makes a cache request, a DMA buffer which temporarily stores a DMA address indicated in the direct memory access, and a cache-control unit which gives priority to a cache-invalidation request over the cache request from the CPU when the cache-invalidation request is generated in connection with the direct memory access, and accesses the cache memory at the same speed as the CPU accesses the cache memory, so as to invalidate a cache address in the cache memory when the DMA address stored in the DMA buffer matches the cache address.

According to another aspect of the present invention, the system as described above further includes a bus-request-control-and-bus-interface-control unit which generates the cache-invalidation request and stores the DMA address in the DMA buffer upon a bus request when the input/output-control unit issues the bus request in an attempt to perform the write operation with respect to the main-memory unit.

According to another aspect of the present invention, the system as described above is such that the bus-request-control-and-bus-interface-control unit put another bus request on a hold when another input/output-control unit makes the another bus request in an attempt to perform a write operation with respect to the main-memory unit while the DMA buffer indicates a busy status.

According to another aspect of the present invention, the system as described above is such that the cache memory includes an instruction-cache memory which stores instructions as part of the information, and an operand-cache memory which stores operands as part of the information, and such that the cache-control unit includes an instruction-cache-control unit which controls access to the instruction-cache memory, an operand-cache-control unit which controls access to the operand-cache memory, and a cache-invalidation buffer, provided in the operand-cache-control unit, which temporarily stores an operand-write address when an operand is written in the operand-cache memory by a request from the CPU, wherein the instruction-cache-control unit invalidates a cache address in the instruction-cache memory when the operand-write address stored in the cache-invalidation buffer matches the cache address.

According to another aspect of the present invention, the system as described above is such that the instruction-cache-control unit and the operand-cache-control unit operate independently of each other when attending to requests from the CPU as the CPU attempts to access the instruction-cache memory and the operand-cache memory.

In the present invention as described above, the system having the central-control unit, the main-memory unit, and the input/output-control unit connected via a system bus is provided with the cache memory for temporarily storing data in the central-control unit and the DMA buffer for temporarily storing a DMA address when a DMA-write operation is conducted by the input/output-control unit. In this configuration, the DMA address at which the input/output-control unit accesses the main-memory unit is held in the storage, and an address comparison is made between the DMA address in the storage and cache addresses so as to check if there is an address match.

If a match is found between the DMA address stored in the DMA buffer and any cache address of the cache memory, the matched address of the cache memory is invalidated by the central-control unit, so that consistency is maintained between the contents of the cache memory and the contents of the main-memory unit.

Further, the cache memory is divided into the instruction-cache memory and the operand-cache memory, and a buffer is provided to store an operand-write address when a write operation is conducted with respect to the operand-cache memory. The central-control unit invalidates a pertinent address of the instruction-cache memory if this address of the instruction-cache memory matches the operand-write address stored in the buffer.

This configuration allows the instruction and operand cache-control units to operate independently of each other, while insuring data consistency between the instruction-cache memory and the operand-cache memory as well as between the cache memories and the main-memory unit, thereby enhancing the system performance.

Other objects and further features of the present invention will be apparent from the following detailed description when read in conjunction with the accompanying drawings.

DESCRIPTION OF THE PREFERRED EMBODIMENTS

In the following, a principle and embodiments of the present invention will be described with reference to the accompanying drawings.

Figure 2:
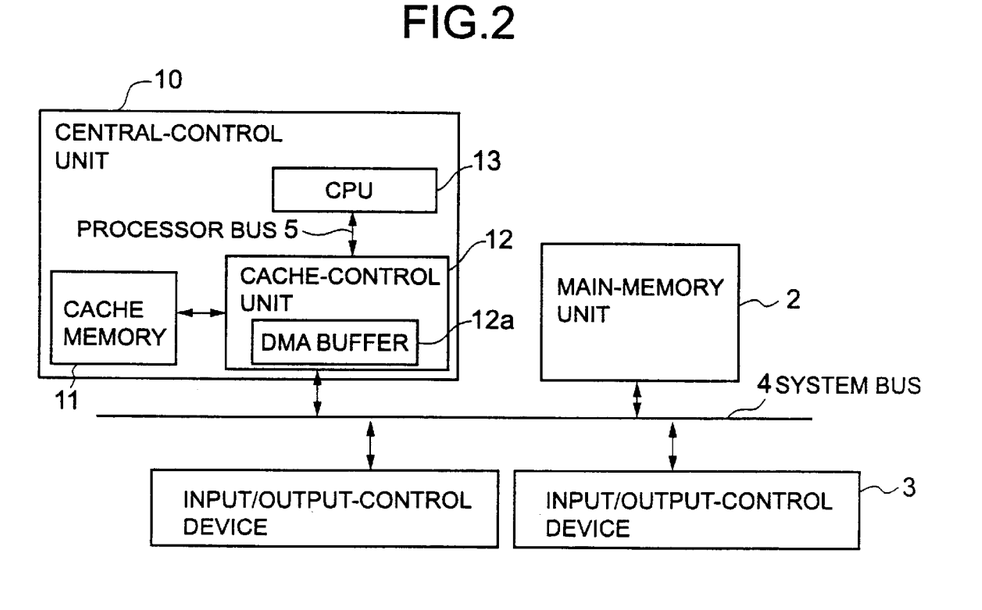
FIG. 2 is a schematic block diagram of a system according to a principle of the present invention.

FIG. 2 is a block diagram of a system according to a principle of the present invention. In FIG. 2, the same elements as those of FIG. 1 are referred to by the same numerals, and a description thereof will be omitted.

The central-control unit 10 includes the cache memory 11, a cache-control unit 12 for controlling operations of the cache memory 11, and a DMA (direct memory access) buffer 12a which stores addresses used when the input/output-control device 3 accesses the main memory 2 by use of a DMA mode. Further, the central-control unit 10 includes a CPU (central processing unit) 13.

The central-control unit 10 further includes a processor bus 5 connecting between the cache-control unit 12 and the CPU 13. The cache-control unit 12 is connected to the system bus 4, which connects between all the relevant elements. As shown in the figure, the main memory 2 and the input/output-control device 3 are connected to the system bus 4.

In the configuration of FIG. 2 according to the present invention, an address is stored when the input/output-control device 3 accesses this address of the main memory 2 as part of an write operation, and is compared with addresses encompassed by the cache memory 11. In this manner, a check is made as to whether the same address is present.

The central-control unit 10 invalidates data of the cache memory with respect to a particular address when this particular address matches the address stored in the DMA buffer.

In this manner, when the same address as that stored in the DMA buffer 12a is found in the cache memory 11, the CPU 13 invalidates a pertinent portion of the cache memory 11. This insures that the contents of the cache memory 11 sustain consistency with the contents of the main memory 2.

Further, the cache memory 11 may be divided into an instruction cache and an operand cache, and a buffer for storing an address used in an operand-write operation may be provided. In this configuration, the central-control unit 10 invalidates a particular address of the instruction cache when this particular address matches the address stored in the abovementioned buffer during the operand-writhe operation.

In this manner, a portion of the instruction cache provided separately from the operand cache is invalidated when the corresponding address matches with the address stored in the buffer, thereby insuring consistency between the contents of the cache memory 11 and the contents of the main memory 2.

A description will be provided below in further detail with regard to the operations of the system of FIG. 2.

In FIG. 2, the processor bus 5 is generally ten times as fast as the system bus 4 in terms of operation speed thereof. If the processor bus 5 is suspended when the input/output-control device 3 accesses the main memory 2, therefore, the CPU 13 has to forsake at least 10 accesses that would have been made to the cache memory 11 each time the input/output-control device 3 accesses the main memory 2. In order to avoid this, the cache-control unit 12 stores an address to which a write access is made by the input/output-control device 3, and performs a cache-access operation at the same speed as a cache-access operation made by the CPU 13.

Priority given to this cache access is higher than that given to the cache access by the CPU 13. The CPU 13 thus has to wait only a time period equivalent to one cache access before being able to access the cache memory 11 next time. Further, when there is data stored in the DMA buffer 12a, a system arbiter (not shown) denies a request from the input/output-control device 3 to access the bus by not returning acknowledgement to the request. This eliminates a need to install more than one buffer and a need to abort a DMA-write operation.

In other words, the cache-access arbiter and the system-bus arbiter are separately provided, wherein the cache-access arbiter gives priority to the input/output-control device 3, and the system-bus arbiter denies a request from the input/output-control device 3 to access the bus if such an access is granted once until the cache-control unit 12 returns an acknowledgement. This prevents a decline in the system performance.

In the case of the system in which the instruction cache and the operand cache are provided, the buffer temporarily stores a write address when an operand-write operation is performed during the instruction-cache invalidating mode. Based on the write address stored in the buffer, a request for invalidating the instruction cache is made to the cache memory. This request is given higher priority than a request from the CPU to load an instruction.

In this manner, the instruction-cache memory and the operand-cache memory operate independently of each other, thereby eliminating such a waiting period as would be necessary in the related art in which a write operation would have to be delayed until both of the cache memories become available. Further, if the buffer is full, a next operand-access operation is delayed until the buffer becomes available.

Figure 3:
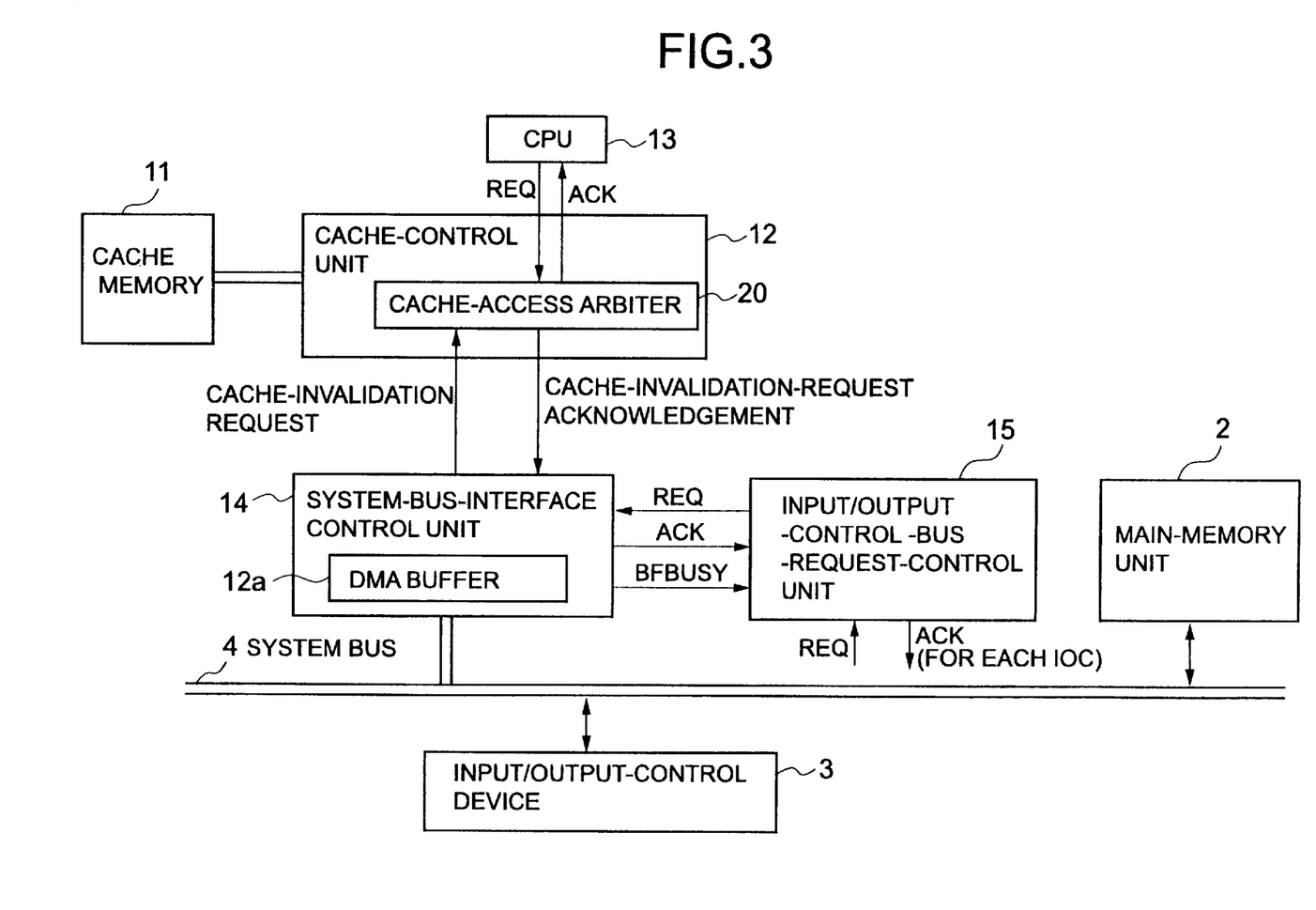
FIG. 3 is a block diagram of a first embodiment of the present invention.

FIG. 3 is a block diagram of a first embodiment of the present invention. The same elements as those of FIG. 2 are referred to by the same numerals, and a description thereof will be omitted.

In FIG. 3, the input/output-control device 3 and the main memory 2 are connected to the system bus 4. Other elements shown in FIG. 3 belong to the central-control unit 10 which is also connected to the system bus 4.

The central-control unit 10 includes the cache memory 11, the cache-control unit 12 for controlling the cache memory 11, the CPU 13 for attending to overall control of the central-control unit 10, a system-bus-interface-control unit 14, and an input/output-control-bus-request-control unit 15. The cache-control unit 12 includes a cache-access arbiter 20. The system-bus-interface-control unit 14 is connected to the system bus 4, and attends to control of a system-bus interface. The system-bus-interface-control unit 14 includes the DMA buffer 12a.

The input/output-control-bus-request-control unit 15 is connected to the system bus 4 and the system-bus-interface-control unit 14, and exchanges a bus-request signal REQ, an acknowledgement signal ACK, and a buffer-busy signal BFBUSY with the system-bus-interface-control unit 14. The input/output-control-bus-request-control unit 15 exchanges the bus-request signal REQ and the acknowledgement signal ACK with the system bus 4. The acknowledgement signal ACK is transmitted each time the input/output-control device 3 accesses the system bus 4. Further, a cache-invalidation request and a cache-invalidation-request acknowledgement are exchanged between the system-bus-interface-control unit 14 and the cache-control unit 12.

In what follows, operations of the system shown in FIG. 3 will be described in detail.

The cache-access arbiter 20 arbitrates between a cache request REQ from the CPU 13 and the cache-invalidation request from the system-bus-interface-control unit 14 when the cache-invalidation request is resulted from a DMA-write operation by the input/output-control device 3. The system-bus-interface-control unit 14 arbitrates between an access attempted by the CPU 13 and a DMA request made by the input/output-control device 3, both of which are directed to the main memory 2. Such an access is attempted by the CPU 13 when the CPU 13 requires a write access to the main memory 2 or when a cache-miss hit occurs. If the access attempted by the CPU 13 is granted, the system-bus-interface-control unit 14 accesses the main memory 2 accordingly. If the request from the input/output-control device 3 is accepted, the system-bus-interface-control unit 14 stores the accessed address in the DMA buffer 12a, and sends a cache-invalidation request to the cache-control unit 12.

The input/output-control-bus-request-control unit 15 arbitrates between several bus requests issued from different input/output-control devices 3 (only one is shown in FIG. 3), and informs the system-bus-interface-control unit 14 of a bus request REQ.

When the input/output-control device 3 issues a bus request REQ, this bus request is forwarded to the system-bus-interface-control unit 14 via the input/output-control-bus-request-control unit 15. If the system-bus-interface-control unit 14 is idle, the system-bus-interface-control unit 14 returns the acknowledgement signal ACK to the input/output-control-bus-request-control unit 15. If the DMA buffer 12a already has data stored therein, and the cache-invalidation operation is not yet finished, the acknowledgement signal ACK is not returned. In this case, the input/output-control device 3 does not take a next action.

Upon receiving the acknowledgement signal ACK, the input/output-control-bus-request-control unit 15 sends an acknowledgement ACK to the input/output-control device 3 which requested use of the bus. Then, the input/output-control device 3 commences a DMA-access operation thereof. When this DMA-access operation is that of a write access, the system-bus-interface-control unit 14 stores the accessed address in the DMA buffer 12a.

The system-bus-interface-control unit 14 then holds a state indicative of presence of DMA-buffer data, and sends a cache-invalidation request to the cache-control unit 12. Upon receiving this request, the cache-control unit 12 accepts this request as having the highest priority (if the CPU 13 is using the cache, the request is accepted as soon as a completion of this cache-access operation). If the address stored in the DMA buffer 12a matches an address covered by the cache memory 11, the cache-control unit 12 invalidates the data of this address. If there is no match, on the other hand, the cache-control unit 12 does nothing but to send an acknowledgement ACK to the system-bus-interface-control unit 14.

The system-bus-interface-control unit 14, having received the acknowledgement ACK, moves on to another state indicating absence of DMA-buffer data. If a new bus request has been already made by this time by the input/output-control device 3, the system-bus-interface-control unit 14 can return an acknowledgement ACK to the input/output-control-bus-request-control unit 15 as soon as an entry into this state.

In this embodiment, if there is a match between the address stored in the DMA buffer 12a and any address of the cache memory 11, the cache-control unit 12 invalidates a corresponding portion of the cache memory 11. This insures that consistency is maintained between the contents of the cache memory 11 and the contents of the main memory 2.

Figure 4:
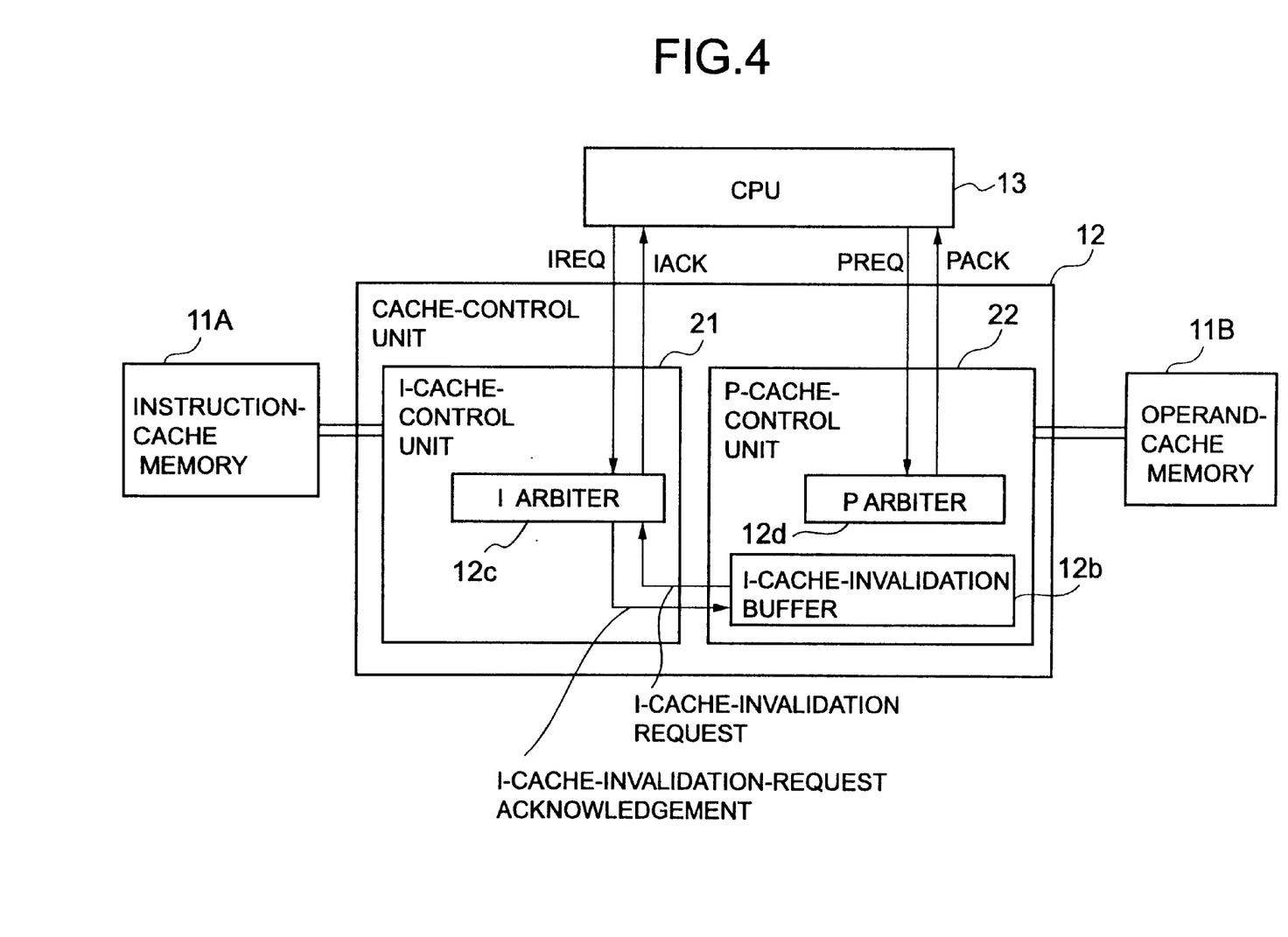
FIG. 4 is a block diagram showing a second embodiment of the present invention.

FIG. 4 is a block diagram showing a second embodiment of the present invention. In FIG. 4, the same elements as those of FIG. 3 are referred to by the same numerals, and a description thereof will be omitted.

In the second embodiment, the cache memory is divided into an instruction-cache memory 11A and an operand-cache memory 11B. Conforming to this division, two different cache-control units are provided, including an I-cache-control unit 21 and a P-cache-control unit 22. The I-cache-control unit 21 controls the instruction-cache memory 11A, and the P-cache-control unit 22 takes controls of the operand-cache memory 11B.

The P-cache-control unit 22 includes an I-cache-invalidation buffer 12b and a P-arbiter 12d. The I-cache-control unit 21 includes an I-arbiter 12c. The I-arbiter 12c sends an instruction-request acknowledgement IACK to the CPU 13, whereas the CPU 13 sends an instruction request IREQ to the I-arbiter 12c. Further, the P-arbiter 12d transmits an operand-request acknowledgement PACK to the CPU 13, whereas the CPU 13 sends an operand request PREQ to the P-arbiter 12d.

An I-cache-invalidation request is transmitted from the I-cache-invalidation buffer 12b to the I-arbiter 12c, while the I-arbiter 12c returns an I-cache-invalidation-request acknowledgement ACK to the I-cache-invalidation buffer 12b. In the following, operations of the configuration shown in FIG. 4 will be described in detail.

The I-arbiter 12c arbitrates between a cache request from the CPU 13 and a cache-invalidation request that is issued when the input/output-control device 3 performs a DMA-write operation. The P-arbiter 12d attends to arbitration between a cache request from the CPU 13 and a cache-invalidation request when the cache-invalidation request entails a DMA-write operation conducted by the input/output-control device 3.

In this manner, the CPU 13 can attend to access to the instruction-cache memory 11A and access to the operand-cache memory 11B independently of each other. The I-cache-invalidation buffer 12b stores an address when an operand-write operation is performed with respect to this address. Then, the I-cache-invalidation buffer 12b sends an I-cache-invalidation request to the I-cache-control unit 21. Upon receiving the I-cache-invalidation request, the I-arbiter 12c refers to the instruction-cache memory 11A to decide if there is an address that is the same as that stored in the I-cache-invalidation buffer 12b. If the same address is found, a pertinent portion of the instruction-cache memory 11A will be expunged.

According to the second embodiment, the cache memory is divided into the instruction-cache memory and the operand-cache memory, and a particular portion of the instruction-cache memory is invalidated when an address corresponding to this portion matches the address stored in the buffer. This insures consistency between the contents of the cache memory and the contents of the main memory.

Figure 5A:
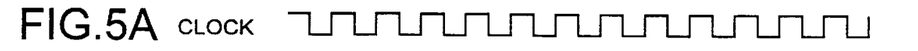
FIGS. 5A through 5P are timing charts showing first operations according to the present invention.
Figure 5B:
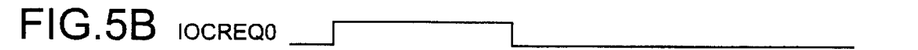
Figure 5C:
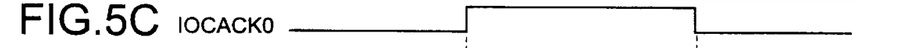
Figure 5D:
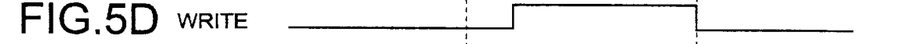
Figure 5E:
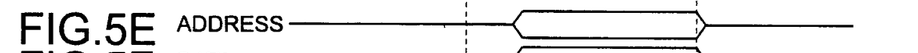
Figures 5F, 5G:
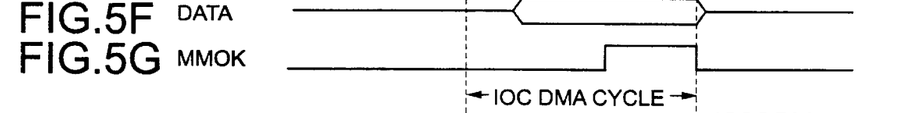
Figure 5H:
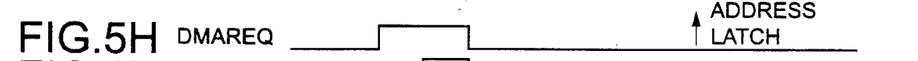
Figure 5I:
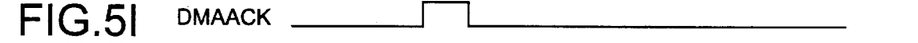
Figure 5J:
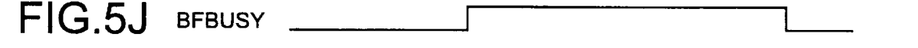
Figures 5K, 5L, 5M:
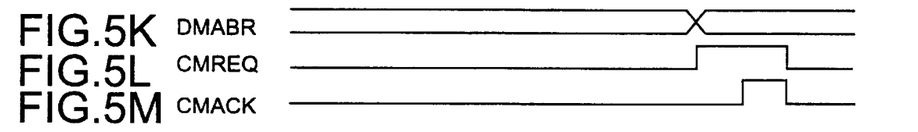
Figures 5N, 5O:
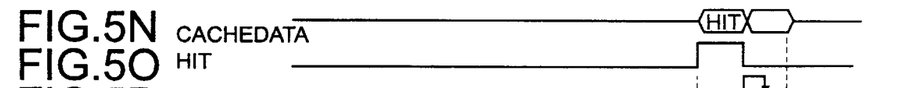
Figure 5P:
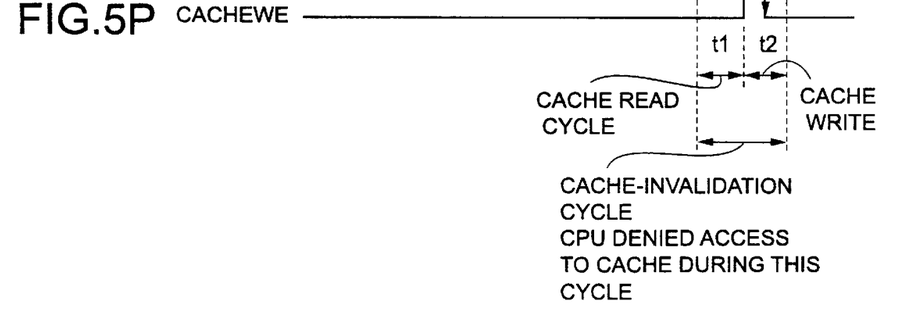

FIGS. 5A through 5P are timing charts showing first operations according to the present invention. These operations are performed by the system of FIG. 3.

The figures show a central-control-unit-operation clock CLOCK, a system-bus request IOCREQO from an input/output-control device IOCO, a bus acknowledgement IOCACKO sent to the input/output-control device IOCO, a system-bus-write signal WRITE for writing data in the main memory, a system-bus address ADDRESS (an address in the main memory), system-bus data DATA, a response MMOK from the main memory to the system bus, a bus request DMAREQ from the input/output-control-bus-request-control unit 15 to the system-bus-interface-control unit 14, an acknowledgement DMAACK responding to the bus request DMAREQ, a busy signal BFBUSY indicating a busy status of the DMA-address buffer and putting a request from another IOC on a hold, a DMA buffer DMABR, a cache-invalidation request CMREQ made to the cache-control unit 12, an acknowledgement CMACK responding to the cache-invalidation request CMREQ, a cache-memory data bus CACHEDATA, a cache-hit signal HIT, and a cache-memory-write-enable signal CACHEWE.

When the input/output-control device IOCO makes a system-bus request (IOCREQO), data is written in the main memory 2 during an IOCDMA cycle shown in the figures. Concurrently with the data-write operation, a corresponding address is stored in the DMA buffer 12a at an address-latch timing shown in FIG. 5G.

As shown in FIG. 5H, when the input/output-control-bus-request-control unit 15 sends the bus request DMAREQ to the system-bus-interface-control unit 14, the system-bus-interface-control unit 14 responds by returning the acknowledgement DMAACK shown in FIG. 5I. After this, the busy signal BFBUSY changes to HIGH as shown in FIG. 5J, indicating that the DMA buffer 12a is busy. This will put a next request from another input/output-control device on a hold.

FIG. 5L shows a timing at which the system-bus-interface-control unit 14 sends the cache-invalidation request CMREQ to the cache-control unit 12. In response, the cache-control unit 12 returns the acknowledgement CMACK to the system-bus-interface-control unit 14 as shown in FIG. 5M.

As shown in FIG. 5N, the cache-memory-data bus CACHEDATA indicates that the same address as that stored in the DMA buffer 12a exists in the cache memory (i. e., there is a hit). In this case, the cache-control unit 12 invalidates a pertinent portion of a tag of the cache memory 11 at a timing as shown in FIG. 5P. In the figures, a time period t1 indicates a cache-read cycle, and a time period t2 shows a cache-write cycle. During a combined period t1+t2, the CPU 13 is denied access to the cache memory 11 (such a period is called a cache-invalidation cycle).

Figure 6A:
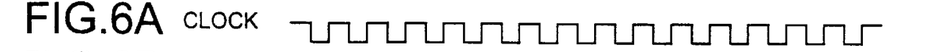
FIGS. 6A through 6R are timing charts showing second operations according to the present invention.
Figures 6B, 6C:
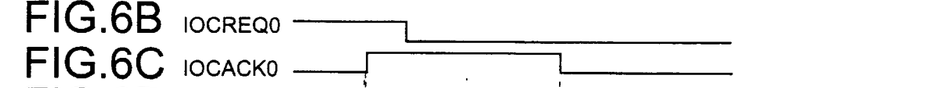
Figures 6D, 6E:
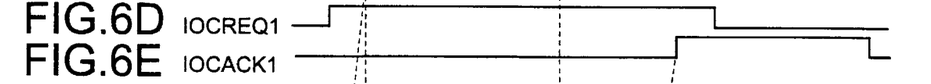
Figures 6F, 6G:
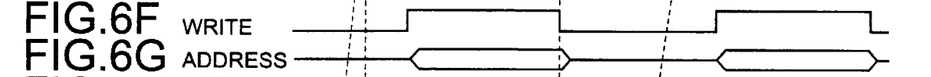
Figures 6H, 6I, 6J:
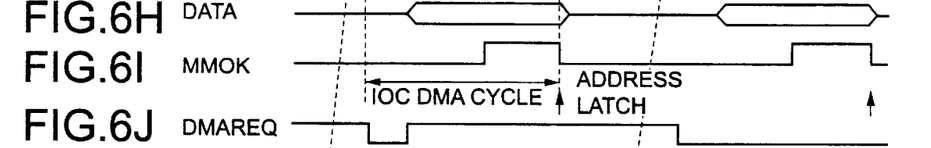
Figure 6K:
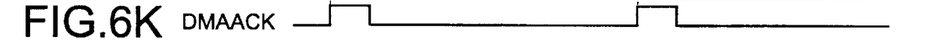
Figure 6L:
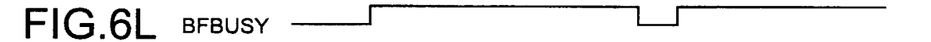
Figure 6M:
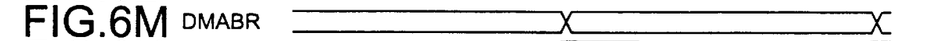
Figures 6N, 6O:
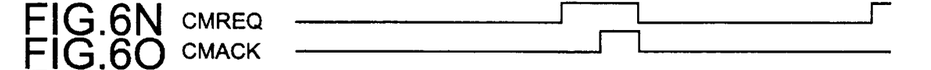
Figures 6P, 6Q:
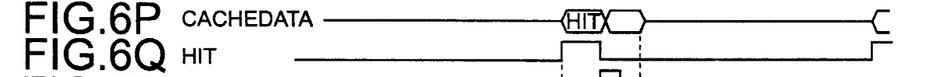
Figure 6R:
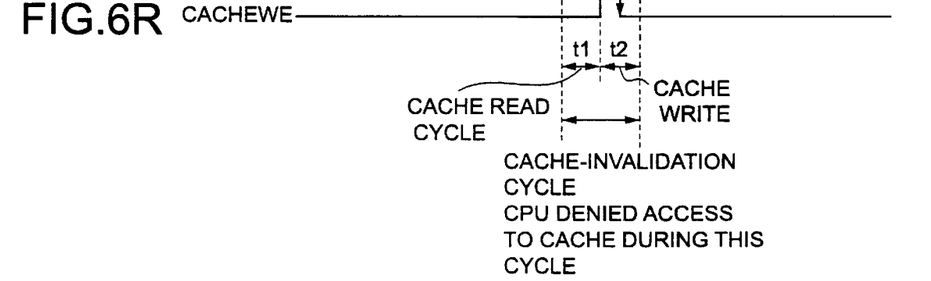

FIGS. 6A through 6R are timing charts showing second operations according to the present invention. These operations are performed by the system of FIG. 3. The same signals as those of FIGS. 5A through 5P are referred to by the same symbols, and a description thereof will be omitted.

FIGS. 6A through 6R show a case in which another input/output-control device IOC1 makes a system-bus request after a request made by the input/output-control device IOC0. FIG. 6D shows a system-bus request IOCREQ1 made by the input/output-control device IOC1, and FIG. 6E illustrates a bus acknowledgement IOCACK1 sent to the input/output-control device IOC1. In the case shown in FIGS. 6A through 6R, the busy signal BFBUSY (FIG. L) at a HIGH level notifies the input/output-control device IOC1 of the busy status of the DMA buffer 12a. As a result, the system-bus request from the input/output-control device IOC1 is put on a hold. That is, only after the completion of the IOCDMA cycle regarding input/output-control device IOC0 and a corresponding cache-invalidation operation with respect to the cache memory, will an IOCDMA cycle of the input/output-control device IOC1 be started.

Figure 7A:
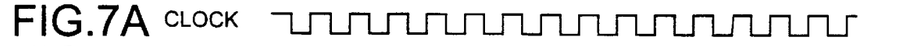
FIGS. 7A through 7S are timing charts showing third operations according to the present invention.
Figure 7B:
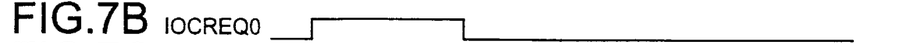
Figure 7C:
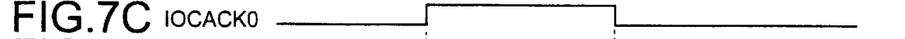
Figure 7D:
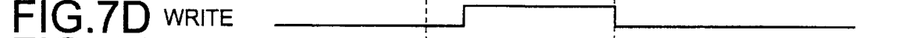
Figure 7E:
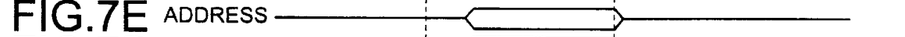
Figure 7F:
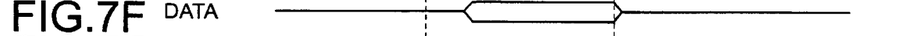
Figure 7G:
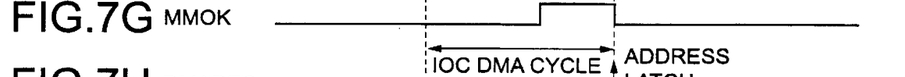
Figures 7H, 7I:
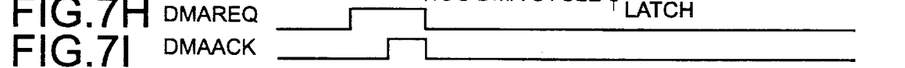
Figure 7J:
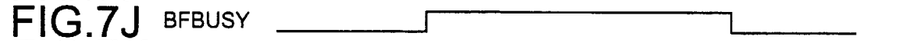
Figures 7K, 7L:
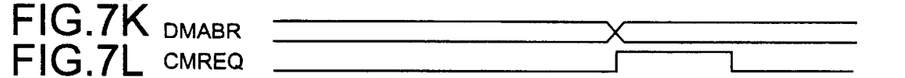
Figures 7M, 7N:
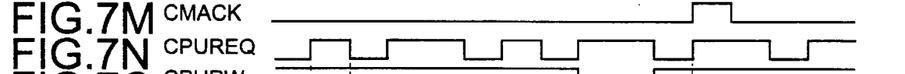
Figures 7O, 7P, 7Q:
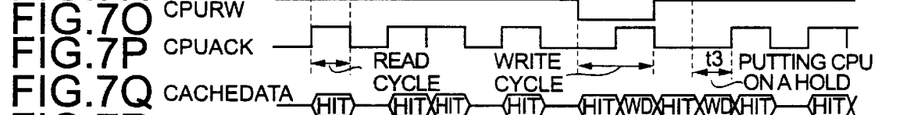
Figures 7R, 7S:
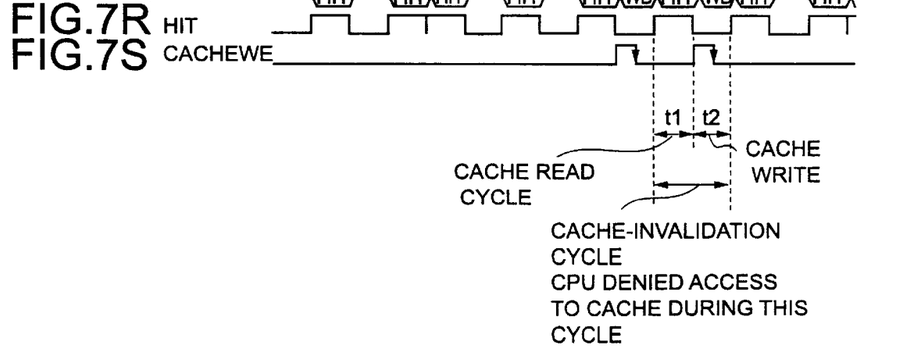

FIGS. 7A through 7S are timing charts showing third operations according to the present invention. In FIGS. 7A through 7S, the same signals as those of FIGS. 5A through 5P are referred to by the same symbols, and a description thereof will be omitted.

FIGS. 7N through 7P show a cache-access signal CPUREQ from the CPU 13, a read/write signal CPURW (indicating a read operation when this signal is HIGH), and a cache acknowledgement CPUACK sent to the CPU 13. In this example, the input/output-control device 3 carries out an IOCDMA cycle while the CPU 13 is accessing the cache memory 11. In this case, the cache-invalidation request CMREQ from the system-bus-interface-control unit 14 takes precedence over an access to the cache memory 11 attempted by the CPU 13.

The input/output-control device IOC performs a data-write operation with respect to the main memory 2 during an IOCDMA cycle shown in the figures. At the end of the IOCDMA cycle, the DMA buffer 12a stores a memory address which was accessed. This is followed by the cache-invalidation request CMREQ sent from the system-bus-interface-control unit 14 to the cache-control unit 12. Upon receipt of this request, the cache-control unit 12 prompts the CPU 13 to stop for a predetermined time period.

When the CPU 13 makes a cache-access request as shown in FIG. 7N, the cache-control unit 12 generates the read/write signal RWCPU with respect to the cache memory 11 as shown in FIG. 7O, and writes data in or reads data from the cache memory 11 as shown in FIG. 7P. Notwithstanding these read/write operations, if a match is found between the address stored in the DMA buffer 12a and any address of the cache memory 11, a cache-invalidation cycle is instituted. When this happens, the CPU 13 halts an operation thereof for a period t3 shown in FIG. 7P. During this period, the cache-control unit 12 writes an invalidation bit WD in a tag area of the cache memory 11 at timings indicated in FIG. 7S.

Figure 8A:
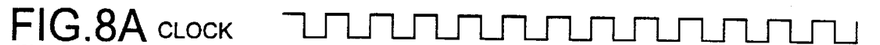
FIGS. 8A through 8T are timing charts showing fourth operations according to the present invention.
Figure 8B:
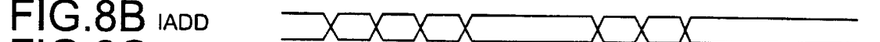
Figure 8C:
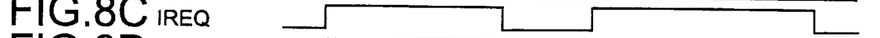
Figure 8D:
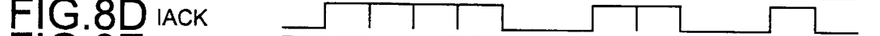
Figure 8E:
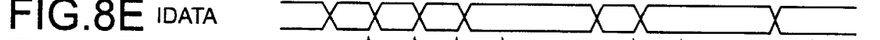
Figure 8F:
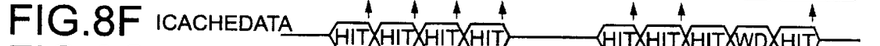
Figure 8G:
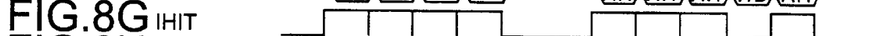
Figure 8H:
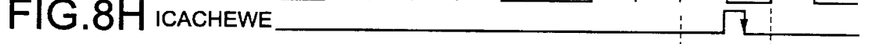
Figure 8I:
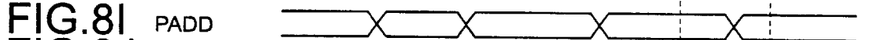
Figure 8J:
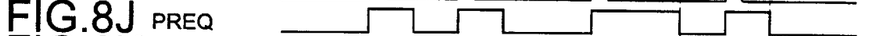
Figure 8K:
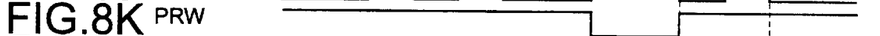
Figures 8L, 8M:
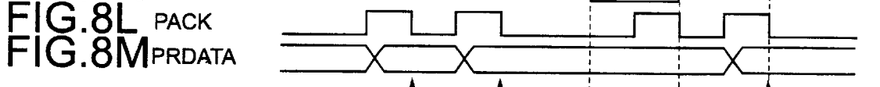
Figure 8N:
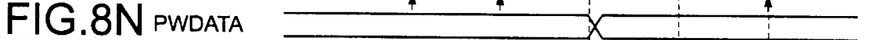
Figure 8O:
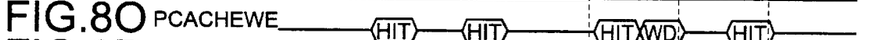
Figures 8P, 8Q:
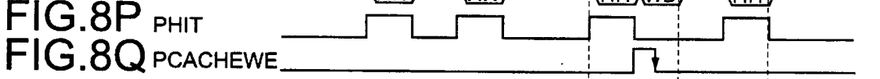
Figure 8R:
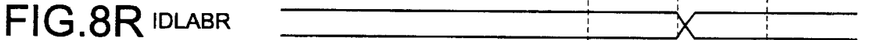
Figure 8S:
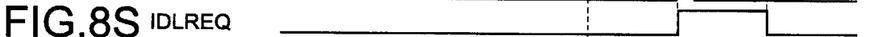
Figure 8T:
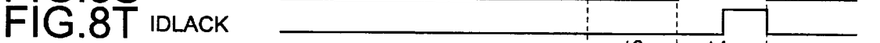

FIGS. 8A through 8T are timing charts showing fourth operations according to the present invention. The configuration of FIG. 4 is used for these operations.

FIGS. 8A through 8E show the central-control-unit-operation clock CLOCK, an instruction address IADD, an instruction request IREQ, an instruction-request acknowledgement IACK, and instruction data IDATA, respectively.

FIGS. 8F through 8M show instruction-cache-memory-bus data ICACHEDATA, an instruction-cache-hit signal IHIT, an instruction-cache-memory-write-enable signal ICACHEWE, an operand address PADD, an operand request PREQ, an operand read/write signal PRW (indicating a read operation when this signal is HIGH), an operand-request acknowledgement PACK, and operand-read data PRDATA.

FIGS. 8N through 9T show operand-write data PWDATA, operand-cache-memory-bus data PCACHEDATA, an operand-cache-hit signal PHIT, an operand-cache-memory-write-enable signal PCACHEWE, an I-cache-invalidation-address buffer IDLABR, an I-cache-invalidation request IDLREQ, and an I-cache-invalidation-request acknowledgement IDLACK.

On the side of the I-cache-control unit 21, the I-arbiter 12c and the CPU 13 exchange the instruction request IREQ and the instruction-request acknowledgement IACK thererbetween so as to read data from the instruction-cache memory 11A.

On the side of the P-cache-control unit 22, the operand request PREQ and the operand-request acknowledgement PACK are exchanged between the P-arbiter 12d and the CPU 13, so that data is read from the operand-cache memory 11B.

An operand-write operation is initiated along with the operand-cache-memory-write-enable signal PCACHEWE shown in FIG. 8Q. A period t3 shown at the bottom of the figures indicates an operand-write cycle. Because of the operand-write operation, the contents of the operand-cache memory 11B is changed.

This results in a discrepancy between the operand-cache memory 11B and the instruction-cache memory 11A, so that there is a need to invalidate a relevant portion of the instruction-cache memory 11A. To this end, as shown in FIG. 8S, the I-cache-invalidation buffer 12b sends the I-cache-invalidation request IDELREQ to the I-arbiter 12c. A period T4 shown at the bottom of the figures illustrates the I-cache-invalidation cycle. During this cycle, as shown in FIG. 8H, cache-invalidation data is written in a relevant tag portion of the instruction-cache memory 11A.

As described above, the present invention can minimize a decline in the cache-access performance of the CPU which is caused by the input/output-control device when it attempts a DMA access, thereby enhancing a system performance. Also, if an update mode for updating DMA data is instituted, data of the cache memory can be updated in the like manner.

In the case where there is a need to invalidate the instruction cache upon writing of an operand, an arbiter circuit was conventionally provided on the side of the instruction-cache memory, so that an access cannot be made until after both the instruction-cache-control unit and the operand-cache-control unit become available. The present invention, on the other hand, allows these cache-control units to operate independently of each other, thereby enhancing the system performance.

Further, the present invention is not limited to these embodiments, but various variations and modifications may be made without departing from the scope of the present invention.

What is claimed is:

1. A system comprising:

a main-memory unit;

an input/output-control unit which performs a write operation with respect to said main-memory unit by way of direct memory access;

a central-control unit which operates based on information stored in said main-memory unit, said central-control unit including:

a cache memory which temporarily stores some of the information; and a DMA address buffer which temporarily stores a DMA address indicated by said direct memory access, wherein said central-control unit invalidates a cache address in said cache memory when the DMA address stored in said DMA address buffer matches the cache address.

2. The system as claimed in claim 1, wherein said cache memory includes:

an instruction-cache memory which stores instructions as part of the information; and an operand-cache memory which stores operands as part of the information, and wherein said central-control unit includes a cache-invalidation buffer which temporarily stores an operand-write address when an operand is written in said operand-cache memory, and invalidates a cache address in said cache memory when the operand-write address stored in said cache-invalidation buffer matches the cache address.

3. A system comprising:

a main-memory unit;

an input/output-control unit which performs a write operation with respect to said main-memory unit by way of direct memory access;

a CPU which operates based on information stored in said main-memory unit;

a cache memory which temporarily stores some of the information, and avails the some of the information to said CPU when said CPU makes a cache request;

a DMA address buffer which temporarily stores a DMA address indicated in said direct memory access;

a cache-control unit which gives priority to a cache-invalidation request over the cache request from said CPU when the cache-invalidation request is generated in connection with said direct memory access, and accesses said cache memory at the same speed as said CPU accesses said cache memory, so as to invalidate a cache address in said cache memory when the DMA address buffer stored in said DMA buffer matches the cache address.

4. The system as claimed in claim 3, further comprising a bus-request-control-and-bus-interface-control unit which generates the cache-invalidation request and stores the DMA address buffer in said DMA buffer upon a bus request when said input/output-control unit issues the bus request in an attempt to perform said write operation with respect to said main-memory unit.

5. The system as claimed in claim 4, wherein said bus-request-control-and-bus-interface-control unit put another bus request on a hold when another input/output-control unit makes the another bus request in an attempt to perform a write operation with respect to said main-memory unit while said DMA address buffer indicates a busy status.

6. The system as claimed in claim 3, wherein said cache memory includes:

an instruction-cache memory which stores instructions as part of the information; and an operand-cache memory which stores operands as part of the information, and wherein said cache-control unit includes:

an instruction-cache-control unit which controls access to said instruction-cache memory;

an operand-cache-control unit which controls access to said operand-cache memory; and a cache-invalidation buffer, provided in said operand-cache-control unit, which temporarily stores an operand-write address when an operand is written in said operand-cache memory by a request from said CPU, wherein said instruction-cache-control unit invalidates a cache address in said instruction-cache memory when the operand-write address stored in said cache-invalidation buffer matches the cache address.

7. The system as claimed in claim 6, wherein said instruction-cache-control unit and said operand-cache-control unit operate independently of each other when attending to requests from said CPU as said CPU attempts to access said instruction-cache memory and said operand-cache memory.

8. A device used in a system having a CPU, a ma in-memory unit, and an input/output-control unit, said device comprising:

a cache memory which temporarily stores information stored in the main-memory unit, and avails the information to the CPU when the CPU makes a cache request to access said cache memory;

a DMA address buffer which temporarily stores a DMA address indicated when the input/output-control unit performs a write operation with respect to the main-memory unit by way of direct memory access;

a cache-control unit which gives priority to a cache-invalidation request over the cache request from the CPU when the cache-invalidation request is generated in connection with the direct memory access, and accesses said cache memory at the same speed as does the CPU access said cache memory, so as to invalidate a cache address in said cache memory when the DMA address buffer stored in said DMA buffer matches the cache address.

9. The device as claimed in claim 8, wherein said cache memory includes:

an instruction-cache memory which stores instructions as part of the information; and an operand-cache memory which stores operands as part of the information, and wherein said cache-control unit includes:

an instruction-cache-control unit which controls access to said instruction-cache memory;

an operand-cache-control unit which controls access to said operand-cache memory; and a cache-invalidation buffer, provided in said operand-cache-control unit, which temporarily stores an operand-write address when an operand is written in said operand-cache memory by a request from the CPU, wherein said instruction-cache-control unit invalidates a cache address in said instruction-cache memory when the operand-write address stored in said cache-invalidation buffer matches the cache address.

* * * * *